United States Patent [19]
Day

[11] 3,707,887
[45] Jan. 2, 1973

[54] STEERING CONTROL MEANS AND GRAB BAR COMBINATION

[75] Inventor: Ralph R. Day, Aurora, Ill.
[73] Assignee: Caterpillar Tractor Co., Peoria, Ill.
[22] Filed: June 14, 1971
[21] Appl. No.: 152,514

[52] U.S. Cl. .................................................74/552
[51] Int. Cl. ................................................B62d 1/04
[58] Field of Search.................74/552, 551.6, 551.1

[56] References Cited

UNITED STATES PATENTS

| | | | |
|---|---|---|---|
| 1,738,855 | 12/1929 | Thompson | 74/551.1 X |
| 2,059,669 | 11/1936 | Skoog | 74/551.1 |
| 2,133,010 | 10/1938 | Barry | 74/551.1 |
| 2,491,609 | 12/1949 | George | 74/552 |
| T875,019 | 6/1970 | Haddad et al. | 74/552 |

*Primary Examiner*—Milton Kaufman
*Assistant Examiner*—F. D. Shoemaker
*Attorney*—Charles M. Fryer et al.

[57] ABSTRACT

A steering handle attached to a steering shaft is utilized both as a control means to steer the vehicle and as a grab bar with which the operator can brace himself when the vehicle is negotiating rough terrain. The steering handle is shaped and placed so as to provide several convenient and comfortable grasping areas for the operator's hands.

8 Claims, 5 Drawing Figures

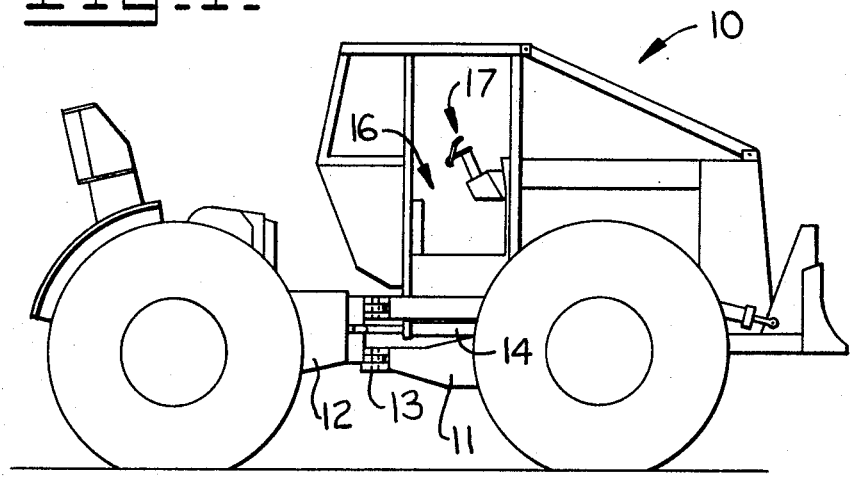
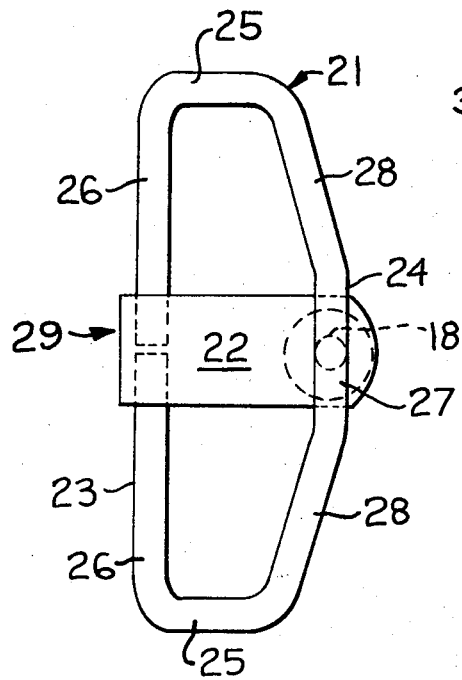
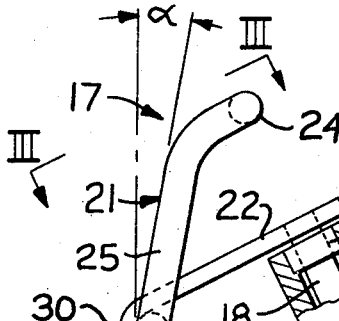
INVENTOR
RALPH R. DAY

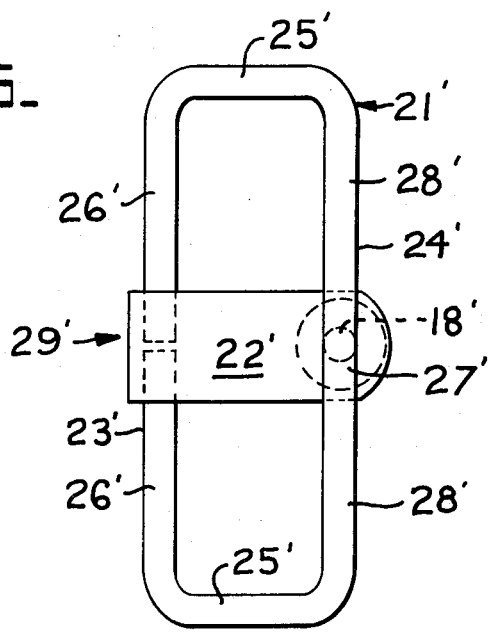
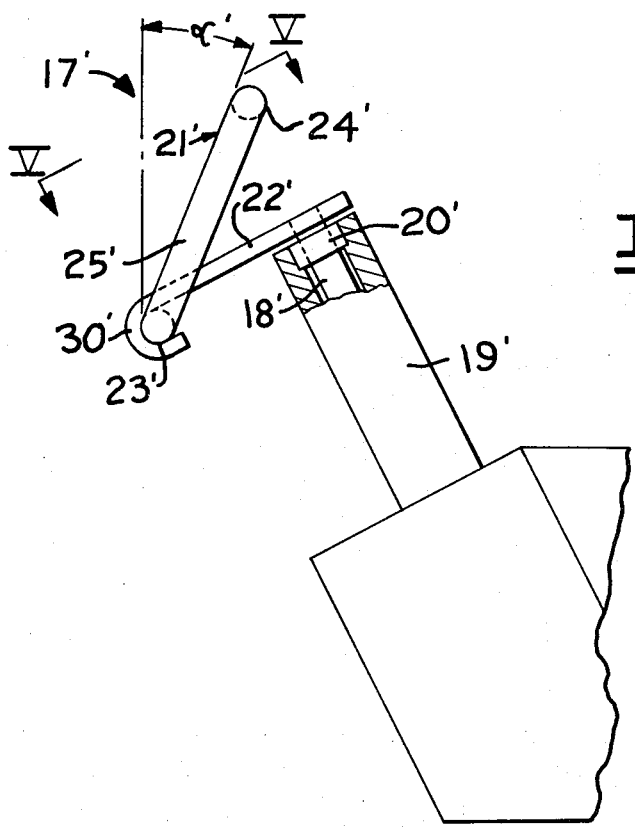

STEERING CONTROL MEANS AND GRAB BAR COMBINATION

BACKGROUND OF THE INVENTION

This invention relates to a steering control means for steering automotive vehicles. More particularly, it concerns a new and improved steering handle for use both to steer the vehicle and as a grab bar with which the operator can brace himself when negotiating rough terrain.

Although a tiller bar was utilized in a few of the very first automotive vehicles, almost all vehicles down to the present are steered by a conventionally-shaped steering wheel which is operatively connected to the steerable front wheels of the vehicle by means of a steering shaft, suitable reduction gearing, and steering linkage. With the introduction of larger vehicles in recent years, particularly in the earthmoving and forestry industries, many types of power steering have been developed whereby steering is done hydraulically or at least with hydraulic assistance. Even though the power steering reduces the manual steering effort and in some cases also requires less steering movement of the steering wheel, the conventionally shaped, circular steering wheel still prevails as the conventional steering control means. One of the disadvantages associated with the use of the conventionally shaped steering wheel on the earthmoving and forestry, i.e., logging, vehicles is that of vehicle control when the vehicle is negotiating rough, uneven terrain. Under these conditions, the operator has a tendency to brace himself by firmly gripping the steering wheel and the bouncing and jostling of the operator frequently causes the operator to inadvertently induce rotational movement of the steering wheel which thereby causes unwanted steering of the vehicle.

Another disadvantage sometimes associated with a conventional steering wheel and a tiller bar for that matter is that they are mounted on the center post or steering shaft with a nut which, in some cases, projects above the rim of the steering wheel. If the operator is thrown forward as is conventional in the event of a front end accident, the projecting nut is liable to cause serious injury to vital organs in the chest cavity such as the heart.

SUMMARY AND OBJECTS OF THE INVENTION

It is, therefore, an object of this invention to overcome the above-described problem by providing a steering control means including a steering handle for steering the vehicle which can also be used as a grab bar without causing unwanted steering movement of the vehicle.

Another object of this invention is to provide a steering control means that presents a relatively long continuous smooth length to the operator and provides some energy absorption capabilities in the event the operator is accidentally thrown against such steering control means.

BRIEF DESCRIPTION OF THE DRAWINGS

FIG. 1 is a side elevational view of a vehicle embodying this invention;

FIG. 2 is an enlarged, side elevational view, partially cut away, of the steering control means;

FIG. 3 is a top plan view of the steering control means taken in the direction III—III of FIG. 2;

FIG. 4 is a side elevational view, partially cut away, of an alternate embodiment of the steering control means; and FIG. 5 is a top plan view of the steering control means taken in the direction V—V of FIG. 4.

DETAILED DESCRIPTION OF THE DRAWINGS

FIG. 1 shows generally at 10 a vehicle in the form of a log skidder which includes a front frame 11 and a rear frame 12 connected together by pivot 13 for pivotal movement about a substantially vertical axis to provide for steering of the vehicle. Pivotal movement of the frames is provided in a conventional manner by a pair of hydraulic jacks, one of which is shown at 14. An operator's station 16 carried on front frame 11 includes a steering control means 17.

Referring to FIGS. 2 and 3, the steering control means shown generally at 17 is suitably connected to a conventional steering shaft 18, which shaft is journaled in a steering column 19 by means of bearings, one of which is shown at 20, and operatively connected to conventional control valve (not shown) for actuation of the hydraulic jacks. The steering control means 17 comprises a manually operable steering handle means 21 fixedly attached to a steering crank arm 22 for causing rotation of the steering shaft 18 upon movement of the steering handle means 21.

The steering handle means 21 includes a lower horizontal crossbar 23, an upper crossbar 24 and a pair of upright members 25 having upper and lower ends secured to the outer ends of the lower and upper crossbars 23 and 24. One end of the steering crank arm 22 is connected to the steering shaft 18 whereas the other end is connected to the lower crossbar 23. Both connections are made by use of conventional fastening means such as welding. The steering crank arm 22 is connected to the midpoint of the crossbar 23 dividing it into two hand gripping sections 26, one being located on each side of the arm 22. The upper crossbar 24 has a horizontal central section 27 and an angled section 28 on each side thereof. The central section 27 of crossbar 24 has a midpoint which is substantially in alignment with the center line of the steering shaft 18 and spaced from the uppermost end of said shaft. That is to say, central section 27 is bisected by the longitudinal axis defined by shaft 18.

The shape and disposition of the steering handle means 21 provide hand gripping sections or areas in the form of upright members 25 which enable the operator to grasp the steering handle means with a gloved hand while at the same time maintaining his wrist at a natural and comfortable angle. For this purpose, the tops of the upright members 25 are tilted forwardly with the optimum angle alpha, with respect to the vertical of the member being approximately 10° although an angle selected from a range of from 0° to 25° is acceptable. Since it is common practice for operators to wear gloves while operating forestry and earthmoving vehicles, the length of hand gripping sections and upright members 25 is so dimensioned as to accommodate a gloved hand. For example, the length of section 26 between the crank arm 22 and the upright member 26 is not less than approximately 4½ inches. Similarly, the length of upright members 25 between the crossbar 23 and sections 28 is also not less than approximately 4½ inches. In a similar manner, the effective grasping length of each of sections 27 and 28 is not less than approximately 4½ inches.

The shape of the steering handle means 21 enables the operator to grasp and rotate it in several conventional ways. For example, by grasping the sections 26 of crossbar 23, the steering handle means is rotated in a manner similar to a tiller bar. By grasping the upright members 25, the steering handle means is rotated similar to grasping the rim of a conventional steering wheel. Grasping the sections 28 is similar to grasping the spokes of a steering wheel.

When the vehicle is negotiating rough terrain, the operator can brace himself by grasping central section 27 of the crossbar 24. Since the section 27 is in alignment with the steering shaft 18, neither a forward or sideways force imparted by the operator will cause the steering handle means to rotate and thus throw the vehicle off course.

Turning now to FIGS. 4 and 5, there is shown a second embodiment of this invention wherein primes are used to denote structure having its analogous numerical counterpart in the first embodiment. With this embodiment, a more or less rectangular steering handle means 21' is produced. The various members 25', 26', 27' and 28' define a planar surface. As with the primary embodiment, central section 27' is in alignment with central shaft 18', as best seen in FIG. 5. With both embodiments, the steering handle means may be conveniently made of unitary, one-piece construction by appropriately bending a length of cylindrical, metal bar stock such that its ends at 29 or 29' are in adjacent relationship within a curved end 30 or 30' of crank arm 22 or 22'.

It is to be understood that the foregoing description is merely illustrative of preferred embodiments of the invention and that the scope of the invention is not to be limited thereto but is to be determined by the scope of the appended claims.

What is claimed is:

1. In a vehicle having a rotatable steering shaft defining an upper end which is operatively connected to a steering control means which effects steering of the vehicle, said steering control means comprising;
    a steering handle means including an upper crossbar, a lower crossbar and upright members having upper and lower ends respectively connected to the upper and lower crossbars, the midpoint of said upper crossbar being spaced from said upper end of and substantially in alignment with the longitudinal axis defined by said steering shaft, said upright members being oriented at an angle with respect to the vertical which is selected from the range from 0° to 25°, and
    a steering crank means operatively connecting said steering shaft with said steering handle means for causing rotation of said steering shaft upon movement of said steering handle means.

2. The invention of claim 1 wherein said steering crank means comprises a steering crank arm having one end thereof fixedly connected to said steering shaft at its upper end and the other end thereof fixedly connected to said lower crossbar member.

3. The invention of claim 2 wherein said upper crossbar includes a central section substantially parallel to said lower crossbar, and side portions angled downwardly from said central section with their outer ends secured to said upright members, said central section being perpendicular to said longitudinal axis defined by said steering shaft.

4. The invention of claim 1 wherein said angle alpha is selected to be approximately 10°.

5. The invention of claim 1 wherein the upright members are each not less than approximately 4½ inches in length.

6. The invention of claim 1 wherein said lower crossbar defines a hand-gripping section on each side of said steering crank means, said hand-gripping sections being not less than approximately 4½ inches in length.

7. The invention of claim 3 wherein each of said side portions and said central section are not less than approximately 4½ inches in length.

8. The invention of claim 1 wherein said upper and lower crossbars and upright members define a planar surface.

* * * * *